No. 646,092. Patented Mar. 27, 1900.
B. G. LAMME.
DYNAMO ELECTRIC MACHINE.
(Application filed June 30, 1899.)
(No Model.)

WITNESSES:

INVENTOR
Benjamin G. Lamme
BY
ATTORNEY.

THE NORRIS PETERS CO., PHOTO-LITHO., WASHINGTON, D. C.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

DYNAMO-ELECTRIC MACHINE.

SPECIFICATION forming part of Letters Patent No. 646,092, dated March 27, 1900.

Application filed June 30, 1899. Serial No. 722,360. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Dynamo-Electric Machines, (Case No. 841,) of which the following is a specification.

My invention relates to dynamo-electric machines; and it has for its object to provide a simple and efficient means for balancing the magnetic circuits of such machines.

It is sometimes found in practice that both alternating and direct current electric generators having two-circuit or series windings and alternating-current generators having open-coil windings have unbalanced magnetic circuits due to one or more of a variety of causes—such, for example, as the unequal wear of bearings and consequent displacement of the armature with reference to the poles of the field-magnet, defective castings, unequal field-magnet coils, an unequal rate of increase or decrease of the polar strengths due to changes in load, &c.

It is important that the poles of a multipolar generator, whether of the direct or alternating current type, should be of substantially the same strength in order that they may exert the same magnetic effect upon the armature. In order to equalize the magnetic circuits, and thus avoid any distortion, either mechanical or magnetic, I propose to provide the armature with a winding or windings each closed upon itself and each independent of the main generating-windings of the machine. If the generating portions of these closed windings are symmetrically located with reference to the poles of the machine, leading and lagging currents will be generated therein, which will be transmitted through the external connections from one portion to another, so as to produce the balancing effect desired.

Figure 1:
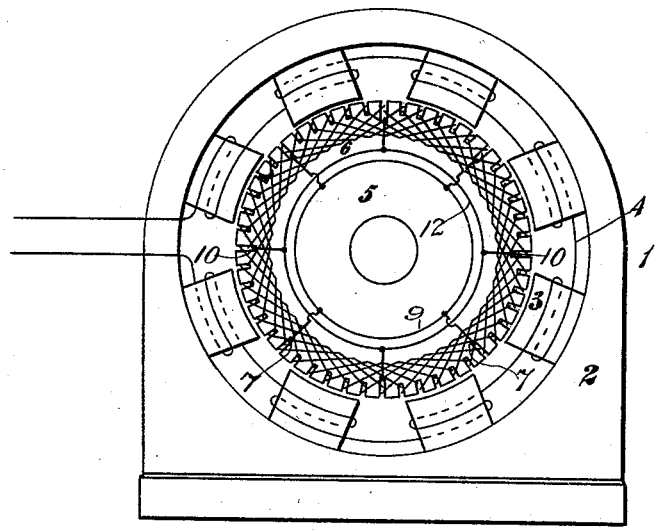
Figure 2:
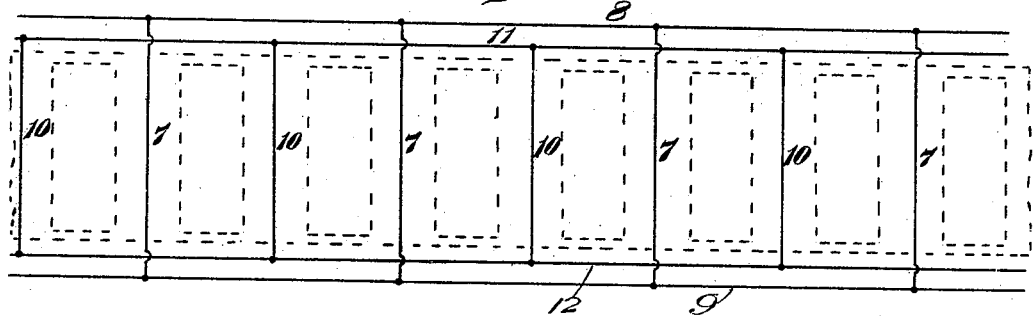

In the accompanying drawings, illustrating my invention, Figure 1 is an end elevation, partially diagrammatic, of a generator provided with balancing-windings in accordance with my invention. Fig. 2 is a diagram representing a development of the armature of the machine shown in Fig. 1, the outline of the armature and the field-magnet pole-pieces being indicated by broken lines and the main coils of both the armature and field-magnet being omitted.

The subject-matter of my invention, as illustrated in the drawings, is as follows: The generator 1 is provided with a field-magnet frame 2, having eight pole-pieces 3, provided with a magnetizing-winding 4, as has been already indicated.

This machine may be designed for the generation of either direct or alternating currents and may have any number of field-magnet pole-pieces found convenient and desirable. The armature 5 is shown as of the ordinary slotted-drum type, having main generating-windings 6, located in said slots and properly arranged and connected in a manner well known in the art. Suitably located at equidistant points around the armature are supplemental balancing-conductors 7, there being four of these conductors, as shown, this number being adapted to an eight-pole machine. A different number of poles would obviously require for symmetrical arrangement a different number of these supplemental balancing-conductors. The conductors 7 are connected together at one end by a ring 8 and at the other end by a ring 9, so that the currents generated in each of said conductors may be transmitted to any or all of the others.

The balancing effect of the means thus far described is pulsating in character, and consequently the adjustment may not be as good as is desired. I therefore find it advisable to employ another set of supplemental balancing-conductors 10, also symmetrically arranged and alternating in position with the conductors 7. These conductors 10 are connected together at one end by a ring 11 and at the other end by a ring 12 for reasons already stated in connection with the other closed winding. With the two windings arranged as shown a fairly uniform balancing effect will be obtained; but it is of course feasible to employ more of these closed windings symmetrically located if a closer adjustment is found necessary or desirable. I have shown the generating-conductors of these windings as located in the same slots as certain of the main windings of the armature, such slots being made slightly deeper to accommodate the additional conductor; but it will be understood that these supplemental conductors may be placed in separate slots or otherwise located in the main slots of the armature, if desired.

I claim as my invention—

1. In a dynamo-electric machine having the usual field-magnet and armature windings, means for balancing the magnetic circuits comprising an auxiliary armature-winding closed upon itself and having generating-conductors symmetrically located with reference to the field-magnet poles.

2. In a dynamo-electric machine having the usual field-magnet and armature windings, means for balancing the magnetic circuits comprising an auxiliary closed winding having one-half as many symmetrically-located generating-conductors as the machine has poles.

3. In dynamo-electric machines having the usual field-magnet and armature windings, a plurality of closed windings for balancing the magnetic circuits, each of which comprises a plurality of generating-conductors symmetrically arranged with reference to the field-magnet poles.

In testimony whereof I have hereunto subscribed my name this 29th day of June, 1899.

BENJ. G. LAMME.

Witnesses:
 JAMES B. YOUNG,
 H. C. TENER.